W. V. TURNER.
FLUID PRESSURE BRAKE.
APPLICATION FILED FEB. 13, 1918.
1,297,518.
Patented Mar. 18, 1919.
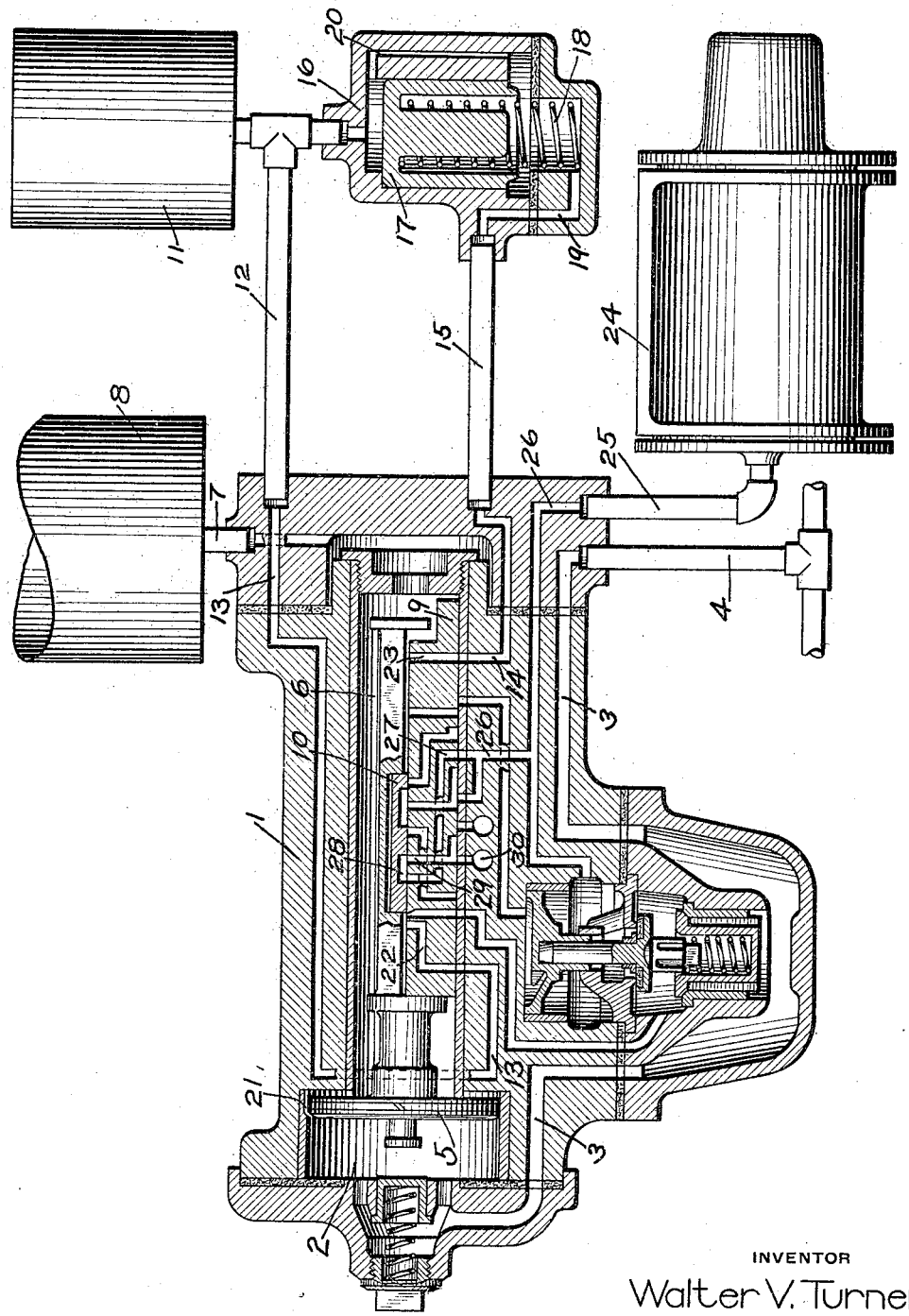
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,297,518.   Specification of Letters Patent.   Patented Mar. 18, 1919.

Application filed February 13, 1918. Serial No. 216,957.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a triple valve device.

When a very light reduction in brake pipe pressure is made to effect an application of the brakes, it sometimes happens that piston ring leakage from the auxiliary reservoir to the brake pipe side of the triple valve piston, especially if there is considerable piston friction, and the increase in auxiliary reservoir volume due to the displacement of the triple valve piston, is sufficient to prevent the creation of the differential pressure necessary to effect the movement of the piston to application position.

The principal object of my invention is to overcome the above difficulty by maintaining the auxiliary reservoir pressure from an additional source of fluid pressure, such as the supplemental reservoir, until the movement of the triple valve parts to application position is assured.

In the accompanying drawing, the single figure is a diagrammatic view, partly in section, of a car brake equipment embodying my invention.

According to the drawing, my invention is shown as applied in connection with a triple valve device of the graduated release type comprising a casing 1 having a piston chamber 2 connected by passage 3 to the brake pipe 4, and containing triple valve piston 5, and having a valve chamber 6, connected by pipe 7 to an auxiliary reservoir 8 and containing a main slide valve 9 and a graduating slide valve 10, mounted on the main valve 9 and having a movement relative thereto, the valves 9 and 10 being adapted to be operated by piston 5.

A supplemental reservoir 11 is connected by pipe 12 to a passage 13 leading to the seat of slide valve 9, for effecting the graduated release of the brakes and, according to my invention, an additional passage 14, leading to the seat of the main slide valve, is connected through pipe 15 and a cut-out valve device 16 to the supplemental reservoir 11.

The cut-out valve device 16 may comprise a casing containing a valve piston 17 constantly subject on one side to pressure in the supplemental reservoir 11 and subject on the opposite side to the pressure of a coiled spring 18 and the pressure in pipe 15 which is supplied thereto through passage 19. A passage 20 connects the opposite sides of the valve piston 17.

In operation, upon charging the brake pipe 4 with fluid under pressure, fluid flows through passage 3 to triple valve piston chamber 2 and thence through the usual feed groove 21 around piston 5 to valve chamber 6, charging the auxiliary reservoir 8 in the usual manner.

Fluid also flows from valve chamber 6, through port 22 in main slide valve 9 to passage 13, the tripple valve parts being in release position, and thence through pipe 12 to charge the supplemental reservoir 11. In release position, a port 23 in the slide valve 9 registers with passage 14, so that fluid is also supplied to the supplemental reservoir by way of passages 19 and 20, and since the opposing fluid pressures on valve piston 17 are now substantially balanced, the spring 18 maintains the valve piston 17 in release position, as shown in the drawing.

In release position, as usual, the brake cylinder 24 is connected through pipe 25, passage 26, port 27 in slide valve 9, cavity 28 in the auxiliary valve 10, and port 29, with exhaust port 30.

When the brake pipe pressure is reduced to effect an application of the brakes, should the reduction be light, a sufficient differential pressure between the auxiliary reservoir and the brake pipe will still be obtained to effect the movement of the triple valve ports to application position, in spite of possible excessive piston ring leakage and piston displacement, since the additional flow of fluid from the supplemental reservoir, through pipe 15, passage 14, and port 23, to the valve chamber 6 will operate to maintain the auxiliary reservoir pressure substantially constant.

Upon movement of the triple valve ports to application position, the passage 14 will be blanked, as well as the graduated release passage 13.

It will be noted that the supply of fluid from the supplemental reservoir to the auxiliary reservoir is not cut off until the main slide valve 9 is shifted from release position, and preferably the ports are so arranged that this flow is only cut off just before the usual service port is opened.

By employing the cut-out valve device 16, the graduated release function is not effected, since upon movement of the triple valve parts to release position, after the brakes have been applied, fluid is vented from the spring side of the valve piston 17 to valve chamber 6, faster than it can be supplied through the restricted passage 20, so that the higher pressure on the opposite side of the valve piston will operate same to cut off connection through passage 20 from the supplemental reservoir 11 to the pipe 15, thus limiting the flow of fluid to valve chamber 6 to that which is admitted through the usual graduated release passage 13 and port 22.

Upon effecting a full release of the brakes, when the auxiliary reservoir pressure has been increased so as to nearly equal the pressure in the supplemental reservoir, the spring 18 will shift the valve piston 17 to its normal release position.

Having now described my invention, what I claim as new and desire to secure by Letters Patent, is:—

1. In a fluid pressure brake, the combination with an auxiliary reservoir and a supplemental reservoir, of a triple valve device having a port for connecting the supplemental reservoir with the auxiliary reservoir and an additional port through which fluid is supplied from the supplemental reservoir to the auxiliary reservoir.

2. In a fluid pressure brake, the combination with an auxiliary reservoir and a supplemental reservoir, of a triple valve device having a main valve and an auxiliary valve for controlling the supply of fluid from the supplemental reservoir to the auxiliary reservoir for effecting a graduated release of the brakes, the main valve being adapted to control an additional port for supplying fluid from the supplemental reservoir to the auxiliary reservoir.

3. In a fluid pressure brake, the combination with an auxiliary reservoir and a supplemental reservoir, of a triple valve device comprising a main valve, an auxiliary valve having a movement relative to the main valve, and a piston for operating the auxiliary valve to close a port through which fluid is supplied from the supplemental reservoir to the auxiliary reservoir and for operating the main valve to close an additional port through which fluid is supplied from the supplemental reservoir to the auxiliary reservoir.

4. In a fluid pressure brake, the combination with an auxiliary reservoir and a supplemental reservoir, of a triple valve device having means for controlling the supply of fluid from the supplemental reservoir to the auxiliary reservoir and a cut out valve device operated by reduced auxiliary reservoir pressure for cutting off the supply of fluid from the supplemental reservoir to the auxiliary reservoir.

5. In a fluid pressure brake, the combination with an auxiliary reservoir and a supplemental reservoir, of a triple valve device having a communication adapted to be opened in the release position of the triple valve parts for supplying fluid from the supplemental reservoir to the auxiliary reservoir and a cut out valve device operating upon movement of the triple valve device to release position for cutting off said communication.

6. In a fluid pressure brake, the combination with an auxiliary reservoir and a supplemental reservoir, of a triple valve device having a main valve provided with a port for establishing connection in release position from the supplemental reservoir to the auxiliary reservoir and a cut out valve device operated upon movement of the triple valve device from application to release position for cutting off the supply of fluid from the supplemental reservoir to the auxiliary reservoir.

In testimony whereof I have hereunto set my hand.

WALTER V. TURNER.

Copies of this patent may be obtained for five cents each, by addressing the "Commissioner of Patents, Washington, D. C."